July 9, 1957 M. L. MARKS 2,798,998

SPEED CONTROL FOR ELECTRIC MOTOR

Filed Aug. 19, 1954 2 Sheets-Sheet 1

INVENTOR.
MONTE L. MARKS

BY

Christie, Parker & Hale
ATTORNEYS

SPEED CONTROL FOR ELECTRIC MOTOR

Filed Aug. 19, 1954 2 Sheets-Sheet 2

INVENTOR.
MONTE L. MARKS

BY

Christie, Parker & Hale
ATTORNEYS

United States Patent Office 2,798,998

Patented July 9, 1957

2,798,998

SPEED CONTROL FOR ELECTRIC MOTOR

Monte L. Marks, Pasadena, Calif., assignor, by mesne assignments, to Consolidated Electrodynamics Corporation, Pasadena, Calif., a corporation of California Application August 19, 1954, Serial No. 451,029

12 Claims. (Cl. 318—318)

This invention relates to speed control arrangements, and it has particular reference to apparatus for controlling the speed of a tape having a reference frequency signal recorded on it.

In magnetic tape recording work it is desirable on playback to move each bit of recorded information past the playback head at the same rate at which these bits of information were recorded at the recording head. Due to irregularities in the movement of the tape during recording and playback, and due to stretching of the tape after information has been recorded on it, some arrangement for speeding up and slowing down the movement of the tape during playback is necessary in order to compensate for these effects.

The speed of the tape may be controlled by providing a signal having a constant frequency and recording it as a reference frequency signal on the tape along with the other recorded information. On playback, the tape reference signal is compared with a constant-frequency ground reference signal to provide an error signal for controlling the speed of the tape. By causing the tape reference signal to have the same frequency as the ground reference signal, the tape is moved at a speed such that the bits of information on the tape are moved past the playback head at the same rate at which they were recorded at the recording head.

The changes in the frequency of the signal which is derived from the tape reference signal are usually small, and hence it is desirable that the control apparatus be independent of drifts caused by the electrical circuits which are employed in the control arrangement so that the small changes in frequency may be detected and employed to control the tape driving apparatus.

Accurate control of the speed of a tape is achieved in the present invention by sampling the tape reference frequency and the ground reference frequency alternately and applying the sampled signals to a frequency discriminator which produces a substantially square wave signal having a phase which is dependent upon whether the tape reference frequency is above or below the ground reference frequency and having an amplitude which is dependent upon the difference between the frequencies of the two reference signals. This square wave signal is employed to control the speed of movement of the tape so as to cause the tape reference frequency to be substantially equal to the ground reference frequency.

Various servo arrangements may be employed to control the speed of the tape. In one embodiment of the invention, the tape is driven by a rotatable member which is driven by a source of power through a flexible coupling, and a servomotor is coupled to the rotatable member which drives the tape for altering the speed of the rotatable member in accordance with the relationship between the frequencies of the two reference signals. The servomotor is coupled to the output of the frequency discriminator and it is responsive to the phase and amplitude and the signal produced by the frequency discriminator. A high-speed servomotor is employed so that it is capable of rapidly altering the speed of the rotatable member which drives the tape so as to correct for small variations in the two reference signals.

In another embodiment of the invention, an alternating current electric motor is employed to drive the tape, and the output signal which is provided by the frequency discriminator is employed to control the frequency of the alternating current which is applied to the drive motor, thereby controlling the speed of rotation of the motor.

In still another embodiment of the servo system, an alternating current motor having two phase windings is employed to drive the tape, and the frequency of the electric energy which is applied to the windings is synchronized with the frequency at which the reference signals are sampled. Theoutput of the frequency discriminator is coupled to one of the phase windings of the motor so as to vary the power which is applied to that winding of the motor in accordance with the phase and the amplitude of the signal which is produced by the frequency discriminator. Thus, the frequency discriminator serves to alter the power which is applied to the drive motor for the tape so as to cause the tape to move at a speed such that the two reference frequencies have a predetermined relationship.

The invention is explained in detail with reference to the drawings, in which.

Figures 1, 2:
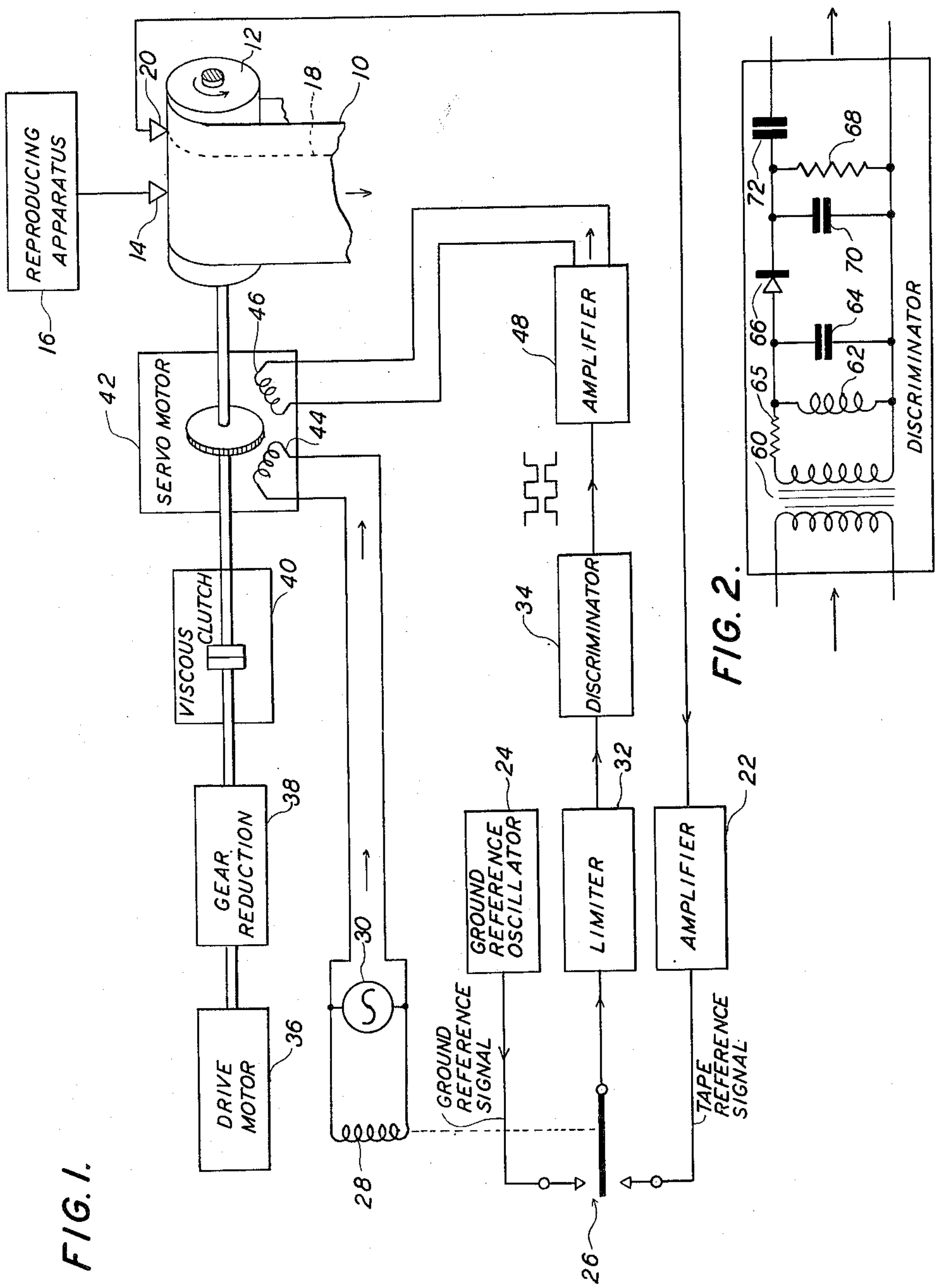
Fig. 1 shows the speed control apparatus of the present invention employed in one type of servo system.
Fig. 2 shows one type of discriminator which is suitable for use in the apparatus of Fig. 1.

In Fig. 1, a magnetic tape 10 is driven by a rotatable member or capstan 12 on playback. Bits of information which have been recorded on the tape are sensed by one or more reading heads 14 coupled to reproducing apparatus 16 which serves to provide a record of the recorded information. When these bits of information were recorded on the tape, a reference frequency signal having a constant frequency was recorded along a channel 18 on the tape.

On playback, it is desirable to move each bit of recorded information past the reading head 14 at the same rate at which these bits of information were recorded on the tape. In order to provide an indication of the relative speed at which the information is moved past the reading head, the tape reference frequency which is recorded in the channel 18 is sensed by a reading head 20 and applied to an amplifier 22.

A ground reference oscillator 24 serves to produce a ground reference signal having the same frequency as the frequency of the reference signal which was recorded in the channel 18 of the tape.

The tape reference signal and the ground reference signal are sampled alternately by a chopper 26 which is actuated by a coil 28 and a source of alternating current 30. The output of the sampling means is applied to a limiter 32 which serves to cause the sampled signals to have a substantially constant amplitude. The output of the limiter is applied to a frequency discriminator 34 which provides a square wave output signal having a phase which depends upon whether the tape reference frequency is above or below the ground reference frequency, and having an amplitude which depends upon the difference between the two frequencies. It follows that the frequency of the square wave output signal is determined by the rate at which the chopper alternates. As shown in the drawings, the chopper alternates at a substantially constant rate, and the frequency of the square wave output signal of the discriminator is equal to the rate at which the chopper alternates.

The output of the frequency discriminator may be employed in various ways to control the speed of movement of the tape in accordance with the relationship between the frequencies of the two reference signals. In Fig. 1, a main drive motor 36 is geared down by a gear reduction 38 and coupled to the capstan 12 through a flexible coupling such as the viscous clutch 40. The output of the viscous clutch is connected to both the capstan 12 and to a high-speed servomotor 42.

A pair of phase windings 44 and 46 provide power for operating the servomotor. Normally power is applied only to the phase winding 44, and if the tape speed does not need to be altered, no power is applied to the phase winding 46. Thus, the servo exerts no torque unless the discriminator 34 provides an error signal, and then the error signal is amplified by an amplifier 48 and applied to the phase winding 46 to cause the servomotor to either increase or decrease the speed of the capstan 12.

The viscous clutch 40 provides flexibility in the coupling between the main drive motor and the capstan so that the servomotor can vary the speed of the capstan independently of the action of the main drive motor. It will be apparent that other types of coupling may be employed to provide flexibility.

Figures 3, 4:
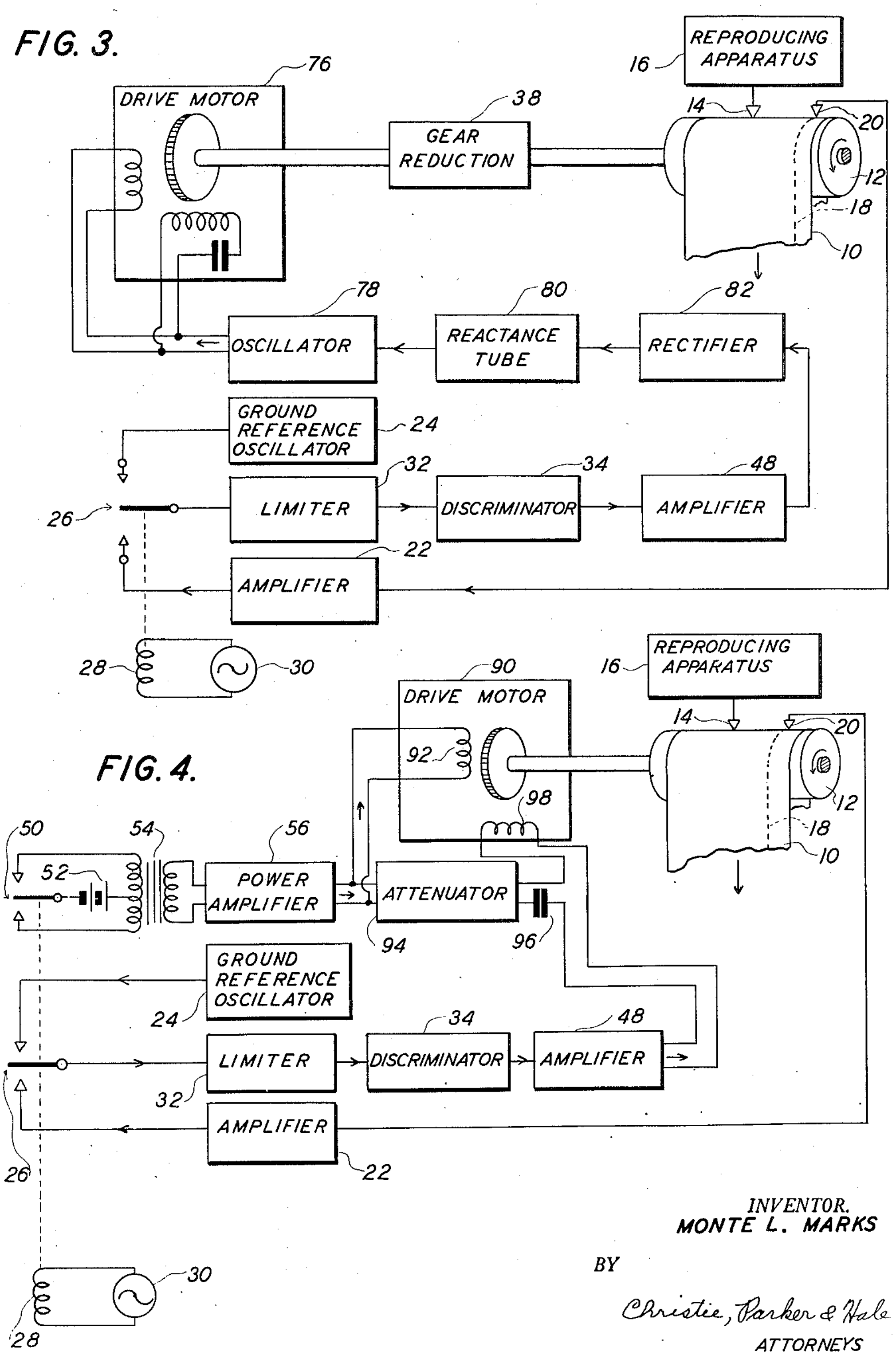
Figs. 3 and 4 show the control apparatus of the invention employed in other types of servo systems.

The frequency of the energy which is applied to the phase winding 44 of the servomotor should be synchronized with the frequency of sampling of the two reference signals. As illustrated in Fig. 1, energy for the phase winding 44 of the servomotor is provided by the source 30 of alternating current which also energizes the coil 28 of the chopper. In the alternative, energy for the phase winding 44 may be provided by a chopper and power amplifier, as illustrated in Fig. 4.

The signals which are applied to the two phase windings of the servomotor should be 90° out of phase so that the motor will rotate in one direction or the other, depending upon whether one of the signals leads or lags the other.

The angular velocity of the capstan for driving the tape is low compared to the rated velocity of the servomotor and is fairly constant. Hence, the servomotor is operated at approximately stall condition. Flutter or drift in the frequency of the tape reference signal will cause a voltage to appear on the phase winding 46 of the servomotor, and the resultant motion of the low inertia servomotor and capstan will tend to buck out any flutter components within the range of the servo system.

Various types of frequency-discriminator circuits may be employed. Fig. 2 shows a relatively simple discriminator circuit which has been used with good results. The circuit comprises an input transformer 60 having an inductor 62 and a capacitor 64 connected in shunt across its secondary winding. The inductor 62 and the capacitor 64 are tuned to resonate a frequency somewhat above the frequency of the ground reference signal. A resistor 65 is connected in series between the secondary winding of the transformer 60 and the resonant circuit so as to cause the amplitude vs. frequency curve for the resonant circuit to have a steeper slope. The resistance of the resistor 65 should be comparable to the impedance of the resonant circuit at resonance.

The signal which is developed across the resonant circuit is rectified by a diode 66, a resistor 68 and a capacitor 70. An output coupling condenser 72 serves to remove the direct current component of the rectified signal so that the output signal of the discriminator is a substantially square wave having a phase which is dependent upon the relative magnitudes of the frequencies of the two reference signals and having an amplitude which is dependent upon the difference between the frequencies of the two reference signals.

Fig. 3 illustrates how the control apparatus of the present invention may be employed in a different type servo wherein the error signal is employed to control the frequency of the alternating current power which is applied to a motor for driving the tape.

An alternating current motor 76 is employed to drive the capstan 12. Power for operating the drive motor is provided by an oscillator 78, and the frequency of the signal provided at the output of the oscillator is controlled by a reactance tube circuit 80.

The output of the discriminator 34 is applied through the amplifier 48 to a rectifier 82, and the output of the rectifier 82 is a direct current signal which is applied to the reactance tube circuit 80 for controlling the frequency of the oscillator 78 in accordance with the phase and amplitude of the signal which is produced by the frequency discriminator.

Preferably the rectifier 82 is a synchronous type which is synchronized with the frequency of the chopper 26. By way of example, it may be a chopper-type rectifier which is actuated by the same coil 28 which actuates the chopper 26.

Fig. 4 illustrates an embodiment of the invention wherein the control apparatus is employed to vary the power which is applied to one phase winding of a two-phase motor for driving the tape.

The drive motor 90 for this embodiment of the invention is a conventional two-phase type, and power for both of the phase windings of the motor is provided by a chopper 50 which is synchronized with the action of the chopper 26 for the control apparatus. The chopper 50 serves to connect a source of potential 52 alternately across the two parts of the primary winding of a transformer 54. The secondary winding of the transformer 54 is coupled to a power amplifier 56 which serves to provide an alternating current signal of suitable voltage and current for the phase windings of the drive motor. The output of the power amplifier 56 is applied directly to the phase winding 92 of the motor and it is applied through an attenuator 94 and phase-shifting condenser 96 to the other phase winding 98 of the motor. The attenuator 94 and the condenser 96 are arranged to provide about 80 to 90% of the total power required for the phase winding 98 of the drive motor from the power amplifier 56. The rest of the power for the phase winding 98 is provided by the discriminator 34 through the amplifier 48, so that the total power which is applied to this phase winding and hence the speed of rotation of the drive motor is determined by the phase and amplitude of the signal which is produced by the frequency discriminator.

If desired, the attenuator 94 may be omitted and the condenser 96 employed to provide the reduction in power to the phase winding 98. Also, the chopper 50 and power amplifier 56 arrangement for providing alternating current power may be omitted if the source 30 is employed to provide the alternating current power for the motor, as illustrated in Fig. 1.

In the various embodiments of the invention, the output signal provided by the discriminator has been described as being a square wave. It will be apparent that the invention is not limited to such a waveform. Moreover, after the signal has been amplified and applied to a control device, such as the servomotor of Fig. 1, the signal will generally be of substantially sinusoidal waveform instead of a square wave.

Although a mechanical chopper has been illustrated in the various embodiments of the invention for sampling the two reference signals, other types of choppers such as electronic devices may be employed as well.

The invention has been described with reference to its use in controlling the speed of movement of a magnetic tape having a reference frequency signal recorded on it. The invention is equally applicable to other types of recording media provided a reference frequency signal is recorded on the medium.

I claim:

1. Apparatus for controlling the speed of a tape having a reference frequency signal recorded magnetically on it comprising means for sensing the magnetically-recorded signal to produce a first reference signal having a frequency which is proportional to the speed of movement of the tape, means for producing a second reference signal having a substantially constant frequency, means for alternately sampling the first and second reference signals at a substantially constant rate, a frequency discriminator coupled to the sampling means and providing an alternating output signal having a substantially constant frequency determined by the rate at which the sampling means alternates and having a phase which is dependent upon the relative magnitudes of the frequencies of the two signals which are sampled, and means responsive to the alternating signal produced by the frequency discriminator for controlling the speed of movement of the tape to cause the frequency of the first reference signal to be substantially equal to the frequency of the second reference signal.

2. The apparatus of claim 1 wherein the means for controlling the speed of movement of the tape comprises a rotatable member which is driven by a source of power through a flexible coupling, and a servomotor coupled to the rotatable member and responsive to the phase of the signal produced by the frequency discriminator for altering the speed of the rotatable member in accordance with the relationship between the frequencies of the first and second reference signals.

3. The apparatus of claim 1 wherein the means for controlling the speed of movement of the tape comprises an alternating current electric motor for driving the tape, and means coupled to the output of the frequency discriminator for providing alternating current power to the electric motor, with the frequency of the alternating current being determined by the phase and the amplitude of the signal which is produced by the frequency discriminator.

4. The apparatus of claim 1 wherein the means for controlling the speed of movement of the tape comprises an alternating current electric motor having two phase windings for driving the tape, means synchronized with the sampling means for providing alternating current power to the two phase windings of the electric motor at a frequency equal to the rate at which the sampling means alternates, and means coupled between the output of the frequency discriminator and one of the phase windings of the motor for varying the power which is applied to the phase winding in accordance with the phase and the amplitude of the signal which is produced by the frequency discriminator.

5. An arrangement for controlling the speed of a tape having a reference frequency signal recorded on it, comprising means for sensing the recorded signal to produce a first reference signal having a frequency which is proportional to the speed of movement of the tape, means for producing a second reference signal, means for alternately sampling the first and second reference signals at a substantially constant rate, frequency-responsive means coupled to the sampling means and providing an alternating output signal having a frequency determined by the rate at which the sampling means alternates and having a phase which is dependent upon the relative magnitudes of the frequencies of the two signals which are sampled, and means responsive to the alternating signal produced by the frequency-responsive means for controlling the speed of movement of the tape.

6. An arrangement for controlling the speed of a rotatable member comprising means for producing a signal having a frequency which is proportional to the speed of rotation of the rotatable member, means for producing a reference signal, means for alternately sampling the two signals at a substantially constant rate, a frequency discriminator coupled to the sampling means and providing an alternating output signal having a phase which is dependent upon the relative frequencies of the two signals which are sampled and having an amplitude which is determined by the difference between the frequencies of the two signals and having a frequency determined by the frequency at which the sampling means alternates, and means responsive to the alternating signal produced by the frequency discriminator for controlling the speed of rotation of the rotatable member.

7. An arrangement for controlling the speed of a rotatable member comprising means for producing a signal having a frequency which is proportional to the speed of rotation of the rotatable member, means for producing a reference signal having a substantially constant frequency, means for alternately sampling the two signals at a substantially constant rate, an amplitude limiter coupled to the output of the sampling means, a frequency discriminator coupled to the output of the limiter and providing an alternating output signal having a phase which is dependent upon the relative magnitudes of the frequencies of the two signals which are sampled and having an amplitude which is determined by the difference between the frequencies of the two signals and having a frequency determined by the rate at which the sampling means alternates, and means responsive to the alternating signal produced by the frequency discriminator for controlling the speed of rotation of the rotatable member in accordance with the phase and amplitude of the signal.

8. Apparatus for controlling the speed of a tape having a reference frequency signal recorded on it, comprising means for sensing the recorded signal to produce a first reference signal having a frequency which is proportional to the speed of movement of the tape, means for producing a second reference signal, means for alternately sampling the first and second reference signal at a substantially constant rate, a frequency discriminator coupled to the sampling means for providing an alternating output signal having a phase which is dependent upon the relative magnitudes of the frequencies of the two signals which are sampled and having a frequency determined by the rate at which the sampling means alternates, a rotatable member for moving the tape, a source of power, a flexible coupling interconnecting the source of power and the rotatable member, a servomotor coupled to the rotatable member and having two phase windings, means for providing electric energy to one phase winding of the servomotor at a frequency equal to the frequency of the alternating output signal of the frequency discriminator, and means intercoupling the output of the frequency discriminator and the other phase winding of the servomotor for controlling the direction of torque of the servomotor in accordance with the phase of the alternating signal produced by the frequency discriminator.

9. Apparatus for controlling the speed of a tape having a reference frequency signal recorded on it, comprising means for sensing the recorded signal to produce a first reference signal having a frequency which is proportional to the speed of movement of the tape, means for producing a second reference signal having a substantially constant frequency, means for alternately sampling the first and second reference signals at a substantially constant rate, frequency-responsive means coupled to the sampling means and providing an alternating output signal having a phase which is dependent upon the relative magnitudes of the frequencies of the two signals which are sampled and having a frequency equal to the rate at which the sampling means alternates, and having an amplitude which is determined by the difference between the frequencies of the two signals, a rotatable member for moving the tape, a source of power, a flexible coupling interconnecting the source of power and the rotatable member, a servomotor coupled to the rotatable member and having two phase windings, means synchronized with the sampling means for providing alternating current electric energy to one phase winding of the servomotor at a frequency equal to the rate at which the sampling means alternates, and means intercoupling the output of the frequency-responsive means and the other phase winding of the servomotor for controlling the direction of torque of the servomotor in accordance with the phase and the amplitude of the alternating signal produced by the frequency-responsive means.

10. Apparatus for controlling the speed of a tape having a reference frequency signal recorded on it, comprising means for sensing the recorded signal to produce a first reference signal having a frequency which is proportional to the speed of movement of the tape, means for producing a second reference signal having a substantially constant frequency, means for alternately sampling the first and second reference signals at a substantially constant rate, an amplitude limiter coupled to the output of the sampling means, a frequency discriminator coupled to the output of the limiter and providing an alternating output signal having a phase which is dependent upon the relative magnitudes of the frequencies of the two signals which are sampled and having a frequency which is equal to the rate at which the sampling means alternates, a rotatable member for moving the tape, a source of power, a flexible coupling interconnecting the source of power and the rotatable member, a servomotor coupled to the rotatable member and having two phase windings, means synchronized with the sampling means for providing electric energy to one phase winding of the servomotor at a frequency equal to the rate at which the sampling means alternates, and means intercoupling the output of the frequency discriminator and the other phase winding of the servomotor for controlling the direction of torque of the servomotor in accordance with the phase of the alternate signal produced by the frequency discriminator.

11. Apparatus for controlling the speed of a tape having a reference frequency signal recorded on it comprising means for sensing the recorded signal to produce a first reference signal having a frequency which is proportional to the speed of movement of the tape, means for producing a second reference signal, means for alternately sampling the first and second reference signals at a substantially constant rate, a frequency discriminator coupled to the sampling means for providing an alternating output signal having a phase which is dependent upon the relative magnitudes of the frequencies of the two signals which are sampled and having an amplitude which is determined by the difference between the frequencies of the two signals and having a frequency which is substantially equal to the rate at which the sampling means alternates, an alternating current electric motor for driving the tape, an oscillator coupled to the electric motor for supplying power to it, and means coupled between the output of the frequency discriminator and the oscillator for controlling the frequency of the oscillator in accordance with the phase and the amplitude of the signal which is produced by the frequency discriminator to cause the frequency of the first reference signal to be substantially equal to the frequency of the second reference signal.

12. Apparatus for controlling the speed of a tape having a reference frequency signal recorded on it comprising means for sensing the recorded signal to produce a first reference signal having a frequency which is proportional to the speed of movement of the tape, means for producing a second reference signal, means for alternately sampling the first and second reference signals at a substantially constant rate, a frequency discriminator coupled to the sampling means for providing a signal having a phase which is dependent upon the relative magnitudes of the frequencies of the two signals which are sampled and having an amplitude which is determined by the difference between the frequencies of the two signals and having a frequency which is determined by the rate at which the sampling means alternates, an alternating current electric motor for driving the tape, the motor having two phase windings, means for providing alternating current power to energize the two phase windings of the motor with the frequency of the alternating current power being synchronized with the frequency at which the reference signals are sampled, and means coupled between the output of the frequency discriminator and one of the phase windings of the motor for providing power to the winding in accordance with the phase and the amplitude of the signal which is produced by the frequency discriminator.

References Cited in the file of this patent

UNITED STATES PATENTS

| | | |
|---|---|---|
| 2,334,510 | Roberts | Nov. 16, 1943 |
| 2,604,321 | Williams | July 22, 1952 |
| 2,627,596 | Andrews | Feb. 3, 1953 |

OTHER REFERENCES

Publication: Electronic Instruments, first edition, by Greenwood, Holdam and MacRae; McGraw-Hill, publishers, 1948, page 380.